United States Patent [19]
Evans

[11] Patent Number: 6,163,786
[45] Date of Patent: Dec. 19, 2000

[54] DIGITAL INTERPOLATING SYSTEM AND METHOD

[75] Inventor: Scott T. Evans, Ft. Collins, Colo.

[73] Assignee: Agilent Technologies, Palo Alto, Calif.

[21] Appl. No.: 09/088,855

[22] Filed: Jun. 2, 1998

[51] Int. Cl.[7] .................................................. G06F 7/38
[52] U.S. Cl. ............................................................ 708/290
[58] Field of Search ................................... 708/290, 313; 345/426, 427

[56]  References Cited

U.S. PATENT DOCUMENTS

| 5,113,362 | 5/1992 | Harston et al. | 708/290 |
| 5,148,381 | 9/1992 | Sprague | 708/290 |
| 5,345,541 | 9/1994 | Kelly et al. | 345/426 |
| 5,402,533 | 3/1995 | Kelley et al. | 345/426 |

FOREIGN PATENT DOCUMENTS

| 1323661 | 1/1971 | United Kingdom | G06F 15/32 |
| 2334358 | 11/1997 | United Kingdom | G06F 7/52 |
| WO92/15065 | 9/1992 | WIPO | G06F 15/353 |

*Primary Examiner*—Chuong Dinh Ngo

[57]  ABSTRACT

A digital interpolating system transmits a digital output value that is within a linear range defined by a minimum value and a maximum value input into the system. Another input value, a control value, indicates which value within the linear range should be output by the system as an interpolated output value. The system utilizes a simple hardware design to efficiently implement an approximation of an equation of a line defined by the minimum and maximum values input into the system. The hardware design includes a plurality of switching devices, such as multiplexers or switches, and a plurality of adders to implement the approximation of the equation. By approximating the equation, the system is capable of providing the minimum and the maximum value input into the system as the interpolated output value when the control value is at a minimum and a maximum, respectively.

37 Claims, 9 Drawing Sheets

DIGITAL INTERPOLATING SYSTEM AND METHOD

BACKGROUND OF THE INVENTION

1. Field of the Invention

The present invention generally relates to digital interpolators and, in particular, to a digital interpolating system and method for utilizing a digital control value to efficiently interpolate a digital output value within a predefined linear range of possible output values. Although not limited to this particular application, the present invention is particularly suited for interpolating the endpoint values of the predefined linear range as the interpolated output value.

2. Related Art

A linear digital interpolator, which is commonly referred to as a "blender," typically receives three digital input values and produces a particular digital output value based on the three digital input values. In this regard, two of the digital input values define the endpoints of a linear range of possible output values. The digital interpolator utilizes the remaining digital input value (the control value) to interpolate within the linear range defined by the other two digital input values in order to transmit a particular output value for each interpolation.

Digital interpolators perform a variety of functions in modem computer systems. For example, computer graphics systems use digital interpolators to perform fading of pixels. In this example, two digital input values represent two different color values. Fading between the two colors can be achieved by manipulating the control value to select different values (and, hence, different colors) within a linear range defined by the two input color values. In this regard, the control value is used to pick a particular color value that is within the linear spectrum.

Although digital interpolators can provide a variety of output values within the two digital input values, most digital interpolators experience difficulty in efficiently providing, as an output, the most significant endpoint value defining the linear range of possible output values. Due to this difficulty, many digital interpolators do not attempt to provide the output value for the most significant endpoint defining the linear range of possible output values. Accordingly, the range of data values that can be possibly output by the digital interpolator is reduced in most prior art systems.

Thus, a heretofore unaddressed need exists in the industry for providing a digital interpolating system and method of efficiently transmitting, as output, the digital values within a linear range defined by two input values, inclusive.

SUMMARY OF THE INVENTION

The present invention overcomes the inadequacies and deficiencies of the prior art as discussed herein. In general, the present invention provides a digital interpolating system and method for efficiently interpolating a digital output value within a predefined linear range based on a digital control value. The digital interpolating system and method, in particular, is capable of transmitting both endpoint values defining the predefined linear range.

The present invention utilizes digital circuitry in order to approximate an equation of a line defined by a maximum value and a minimum value which are input to the system. In this regard, the digital circuitry is configured to receive a maximum digital value, a minimum digital value and a digital control value as inputs. The digital circuitry performs the functionality of summing the values produced by multiplying the maximum digital value by the digital control value, by multiplying the minimum digital value by a one's complement of the digital control value, by forming an integer value of a fraction of the minimum digital value and by forming an integer value of a fraction of the maximum digital value. The digital circuitry also performs the functionality of dividing the sum of these values by the sum of a maximum value associated with the digital control value added to the value of one. The number produced by the foregoing manipulations represents the output value that is to be transmitted by the system as the interpolated output value.

In accordance with another feature of the present invention, the digital circuitry includes a plurality of switching devices, a first plurality of adders and a second plurality of adders. The switching devices are designed to transmit a particular bit value of the minimum digital value upon a detection of a predetermined value of a particular bit of the digital control value. Alternatively, the switching devices are designed to transmit a particular bit value of the maximum digital value upon a detection of another predetermined value of the particular bit of the control value.

The first plurality of adders is configured to receive each significant bit of the minimum digital value having a higher order than a least significant bit of the minimum digital value. One of the first plurality of adders is configured to receive a bit value of the maximum digital value, a bit value of the minimum digital value and one of the particular bits transmitted by the plurality of switching devices.

The second plurality of adders is configured to receive the sum values and carry values transmitted form the first plurality of adders. One adder of the second plurality of adders is configured to receive another bit value of the minimum digital value, one of the sum values and one of the carry values.

In accordance with another feature of the present invention, the digital circuitry includes a plurality of ripple adders configured to add values output by a particular plurality of adders defined within the first and second plurality of adders. The ripple adders preferably add one-half of a least significant bit to the values output by the particular plurality of adders.

The present invention can also be viewed as providing a digital interpolating method for determining a digital output value within a first range defined by a minimum value and a maximum value. Briefly described, the method can be broadly conceptualized by the following steps: multiplying the maximum value by a digital control value to form a first value; multiplying the minimum value by a one's complement of the digital control value to form a second value; forming a first integer value of a fraction of the minimum value; forming a second integer value of a fraction of the maximum value; summing the first value, the second value, the first integer value and the second integer value to form a summation value; and dividing the summation value by a sum corresponding to the maximum control value added to a value of one.

The present invention has many advantages, a few of which are delineated hereafter, as mere examples.

An advantage of the present invention is that the exact values of the maximum and minimum input values defining a linear range of possible output values in a linear digital interpolator can be efficiently transmitted by the system as an interpolated output value.

Another advantage of the present invention is that efficient digital interpolation can be performed with a minimum number of hardware components relative to other interpolation systems of the prior art.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
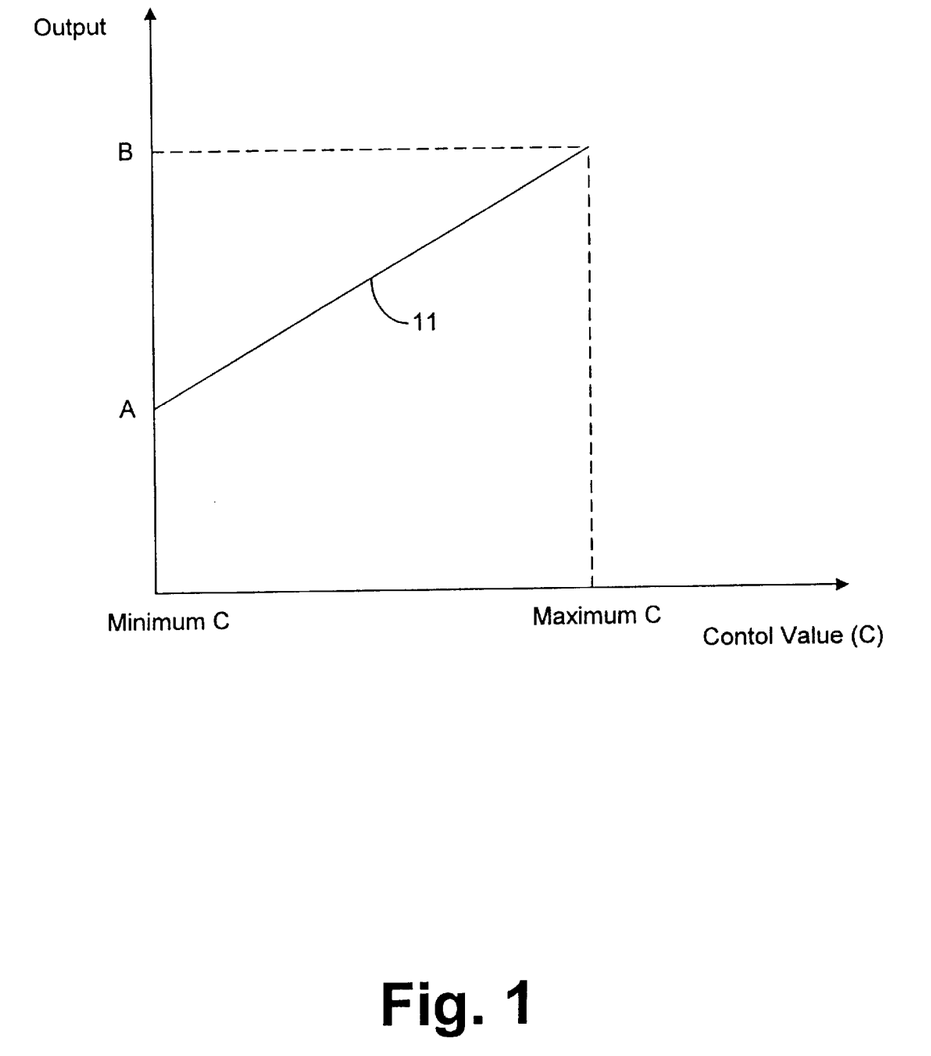
FIG. 1 is a graph of the control value versus output for the digital interpolating system of the present invention.

FIG. 1 depicts a graph of the output of a digital interpolator where line 11 represents the possible range of values that can be output by the digital interpolator. In FIG. 1, the output values of "A" and "B" correspond to the endpoints of line 11 and, therefore, define the possible range of output values for the digital interpolator. Accordingly, for each interpolation, the digital interpolator has knowledge of three digital input values, two of which are the digital values of A and B. The other input value is a control value (C) which can be used to cross-reference a particular output value on line 11.

Since line 11 is of a finite length, there exists a minimum and a maximum value for C. As can be seen by reference to the graph in FIG. 1, when C corresponds to its minimum value, the digital interpolator should output the value of A, and when C corresponds to its maximum value, the digital interpolator should output the value of B. For all other values of C between its minimum and maximum values, the digital interpolator outputs a value between the values of A and B according to line 11.

Since line 11 is linear, the output of the digital interpolator can be characterized by one of the following two equations:

$$\text{Output} = \frac{(B-A)C}{(\max C + 1)} + A \qquad \text{(Equation 1)}$$

or $$\text{Output} = \frac{(B-A)C}{\max C} + A \qquad \text{(Equation 2)}$$

where maxC is the maximum value of C from FIG. 1. As can be seen by reference to Equations 1 and 2, the difference in the two equations exists in the denominator portions of the two equations. The denominator portion of Equation 1 has a value that is one greater than the denominator portion of Equation 2. For example, where C corresponds to an eight bit number, the value of the denominator portion of Equation 1 is 256 whereas the value of the denominator portion of Equation 2 is 255.

Whether a digital interpolator utilizes Equation 1 or Equation 2 affects the possible range of interpolated output values. As known in the art, a digital interpolator implementing Equation 1 in hardware cannot typically output the most significant endpoint of line 11 (i.e., the value of B). However, a digital interpolator implementing Equation 2 in hardware can output any of the values defined by FIG. 1, including the endpoint values of A and B.

Through algebraic manipulation, Equation 1 can be expanded into the following equation:

$$\text{output} = \frac{BC + A(\max C - C) + A}{(\max C + 1)} \qquad \text{(Equation 3)}$$

Noting that (maxC−C) is the one's complement of C, Equation 3 can be easily implemented in hardware. In this regard, (BC+A(maxC−C)) can be implemented in hardware by successively adding shifted values of A and B for each bit of C. Starting with the least significant bit of C, the value of A is accessed if the least significant bit of C is set to zero, and, alternatively, the value of B is accessed if the least significant bit of C is set to one. The next higher order bit of C is then examined, and a zero value is shifted into the least significant bits of A and B such that both A and B correspond to larger values. The current value of A is then added to the previously accessed value if the next higher order bit of C is set to a zero, and the current value of B is added to the accessed value if the next higher order bit of C is set to a one. In this way, each value of C is successively analyzed, and for each analyzed value of C, a shifted value of A or B is added depending on the value of C. Once all of the bits of C have been analyzed, the summation value obtained by the foregoing process represents (BC+A(maxC−C)).

For example, assume that A equals 101 in binary form, B equals 110 in binary form and C equals 010 in binary form, where maxC is, therefore, equal to 111 in binary form. Initially, the value of A (i.e., 101) is accessed since the least significant bit of C is 0. Then 1100, which is the value of B shifted once, is added to A since the next higher order bit of C is a 1. This addition produces the value of 10001 in binary form. Next, 10100, which is the value of A shifted twice, is added to the value of 10001 since the next higher order bit of C (i.e., the most significant bit) is a 0. This produces the value of 100101 in binary form. One ordinarily skilled in the art should realize that the value of 100101 corresponds to (BC+A(maxC−C)) for the values of A, B and C described in this example.

Accordingly, in implementing Equation 3, the value of A is simply added to the summation value obtained by the foregoing process, and the resulting value from this addition is right shifted by the number of bits of C to achieve the functionality of dividing by (maxC +1). Therefore, if C is eight bits long, then the resulting value is right shifted eight times in order to divide by (maxC+1). Because of the foregoing data manipulation techniques, Equation 3 can be efficiently implemented in hardware. However, since Equation 3 is derived from Equation 1, a digital interpolator implementing Equation 3 cannot typically output the exact values of the endpoints of line 11 (i.e., the values of A and B), and the possible range of interpolated output values is reduced.

The present invention overcomes this inadequacy by providing an efficient digital interpolating system and method capable of implementing an approximation of Equation 2. The digital interpolating system and method can be implemented in software, hardware, or a combination thereof. As illustrated by way of example in FIG. 2, the digital interpolating system 20 of the present invention along with its associated methodology is preferably implemented within a computer system 23. For example, computer system 23 can be a computer graphics system that utilizes the digital interpolating system 20 to perform fading as discussed in the Background section hereinbefore.

Figure 2:
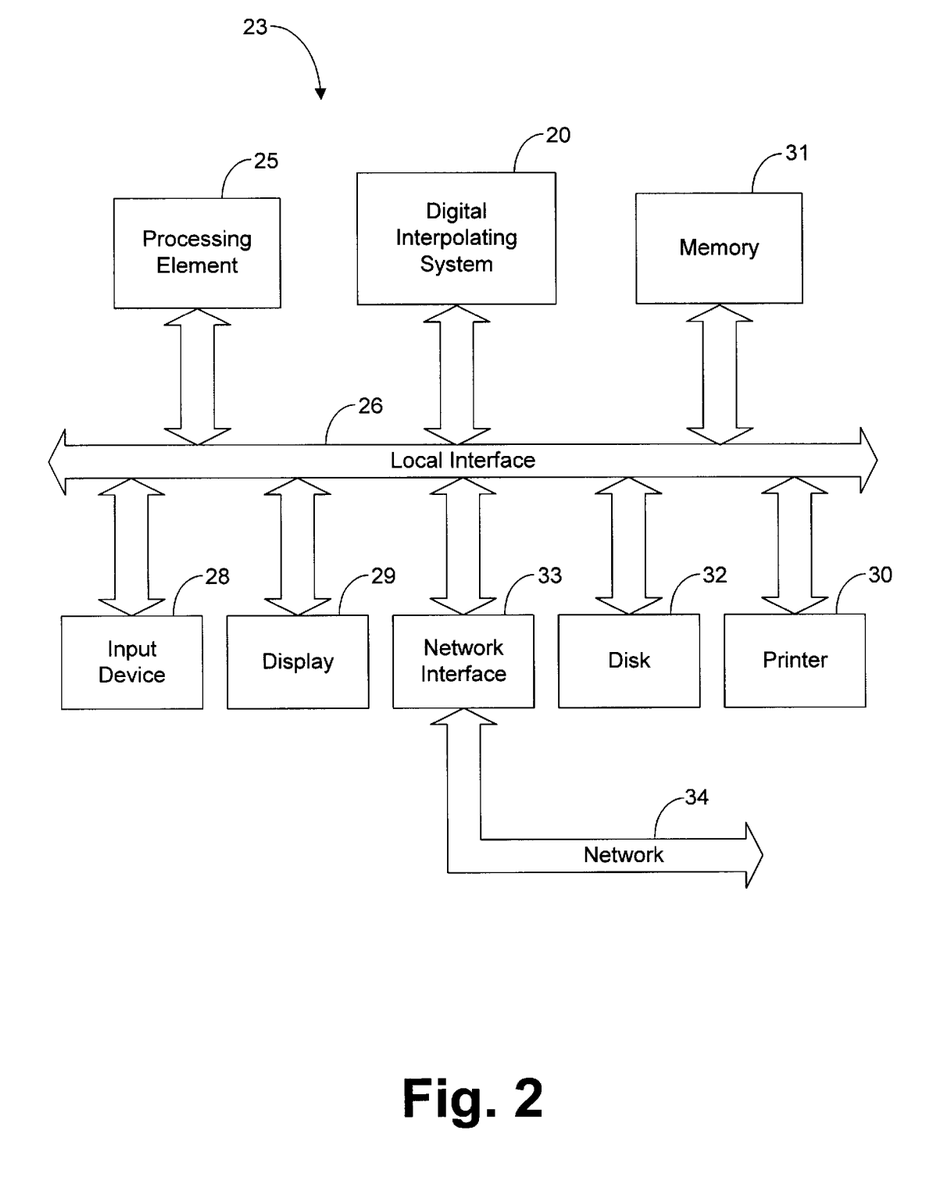
FIG. 2 is a block diagram illustrating a computer system employing a digital interpolating system in-accordance with the principles of the present invention.

The preferred embodiment of the computer system 23 of FIG. 2 comprises one or more conventional processing elements 25, such as a digital signal processor (DSP), that communicate to and drive the other elements within the system 23 via a local interface 26, which can include one or more buses. Furthermore, an input device 28, for example, a keyboard or a mouse, can be used to input data from a user of the system 23, and screen display 29 or a printer 30 can be used to output data to the user. Data may be stored in memory 31, and a disk storage mechanism 32 can be connected to the local interface 26 to transfer data to and from a nonvolatile disk (e.g., magnetic, optical, etc.). The system 23 can be connected to a network interface 33 that allows the system 23 to exchange data with a network 34.

Through algebraic manipulation, Equation 2 can be expanded into the following equation:

$$\text{Output} = \frac{BC + A(\max C - C)}{(\max C + 1)} + \frac{BC + A(\max C - C)}{\max C(\max C + 1)} \qquad \text{(Equation 4a)}$$

For simplicity of discussion hereinafter, Equation 4a will be divided into two parts, "4b" and "4c" where "Equation 4b" refers to the following portion of Equation 4a:

$$\text{Output1} = \frac{BC + A(\max C - C)}{(\max C + 1)} \qquad \text{(Equation 4b)}$$

where "Equation 4c" refers to the following portion of Equation 4a:

$$\text{Output2} = \frac{BC + A(\max C - C)}{\max C(\max C + 1)} \qquad \text{(Equation 4c)}$$

and where:

$$\text{Output} = \text{Output1} + \text{Output2} \qquad \text{(Equation 4d)}$$

As can be seen by reference to Equations 3 and 4, Equation 4b is similar to Equation 3 and, therefore, can be implemented with techniques similar to those described hereinabove. However, Equation 4c is not as similar to Equation 3 and is much more difficult to implement, particularly in hardware. Accordingly, although Equation 4a allows a digital interpolator to output each value defined by line 11, including the values of A and B, most digital interpolators do not implement Equation 4a because of the complexity of implementing Equation 4c.

The present invention utilizes a heretofore novel concept that Equation 4c can be approximated according to the following equation:

$$\frac{BC + A(\max C - C)}{\max C(\max C + 1)} \cong \frac{\text{integer}(A/2) + \text{integer}(B/2)}{\max C + 1} \qquad \text{(Equation 5)}$$

Therefore, Equation 4a can be rewritten as:

$$\text{Output} \cong \frac{BC + A(\max C - C) + \text{integer}(A/2) + \text{integer}(B/2)}{\max C + 1} \qquad \text{(Equation 6)}$$

Accordingly, by implementing Equation 6, the digital interpolating system 20 approximates Equation 4a which is derived from Equation 2. Therefore, the digital interpolating system 20 is capable of outputting a maximum number of interpolated output values, including the endpoint values of A and B.

It should be noted that Equation 6 allows for more accuracy than the number of bits defining the terms of the equation. Therefore, it is desirable to round the result of Equation 6 to the closest integer by adding one-half of a least significant bit according to the following equation:

$$\text{Output} = \text{integer}\left[\frac{BC + A(\max C - C) + \text{integer}\left(\frac{A}{2}\right) + \text{integer}\left(\frac{B}{2}\right)}{\max C + 1} + 0.5\right] \qquad \text{(Equation 7)}$$

Therefore, Equation 7 may be implemented by the digital interpolating system 20 in order to implement the principles of the present invention.

FIG. 3 depicts the digital interpolating system 20 of the present invention. The digital interpolating system 20 is configured to implement Equation 7 which is an approximation of a form of Equation 2. In this regard, the digital interpolating system 20, as depicted by FIG. 3, includes a plurality of switching devices 52, carry save adders 55 and ripple adders 62. The system is designed to receive three inputs. Two inputs, A and B, define the line 11 as depicted in FIG. 1 where the endpoints of the line 11 have, as output values, the values of A and B. The other remaining input, C, is a control value that can be used to select a data value between A and B, inclusive, as the output of the system 20.

Each switching device 52 is configured to receive a bit of input C and a corresponding bits of inputs A and B. Although other implementations are possible, FIG. 3 shows an implementation where each of the input values are four bit digital values. Therefore, the input value of A includes four bit values (A0, A1, A2 and A3), and the input value of B includes four bit values (B0, B1, B2 and B3). Similarly, the input value of C includes four bit values (C0, C1, C2 and C3).

Figure 4:
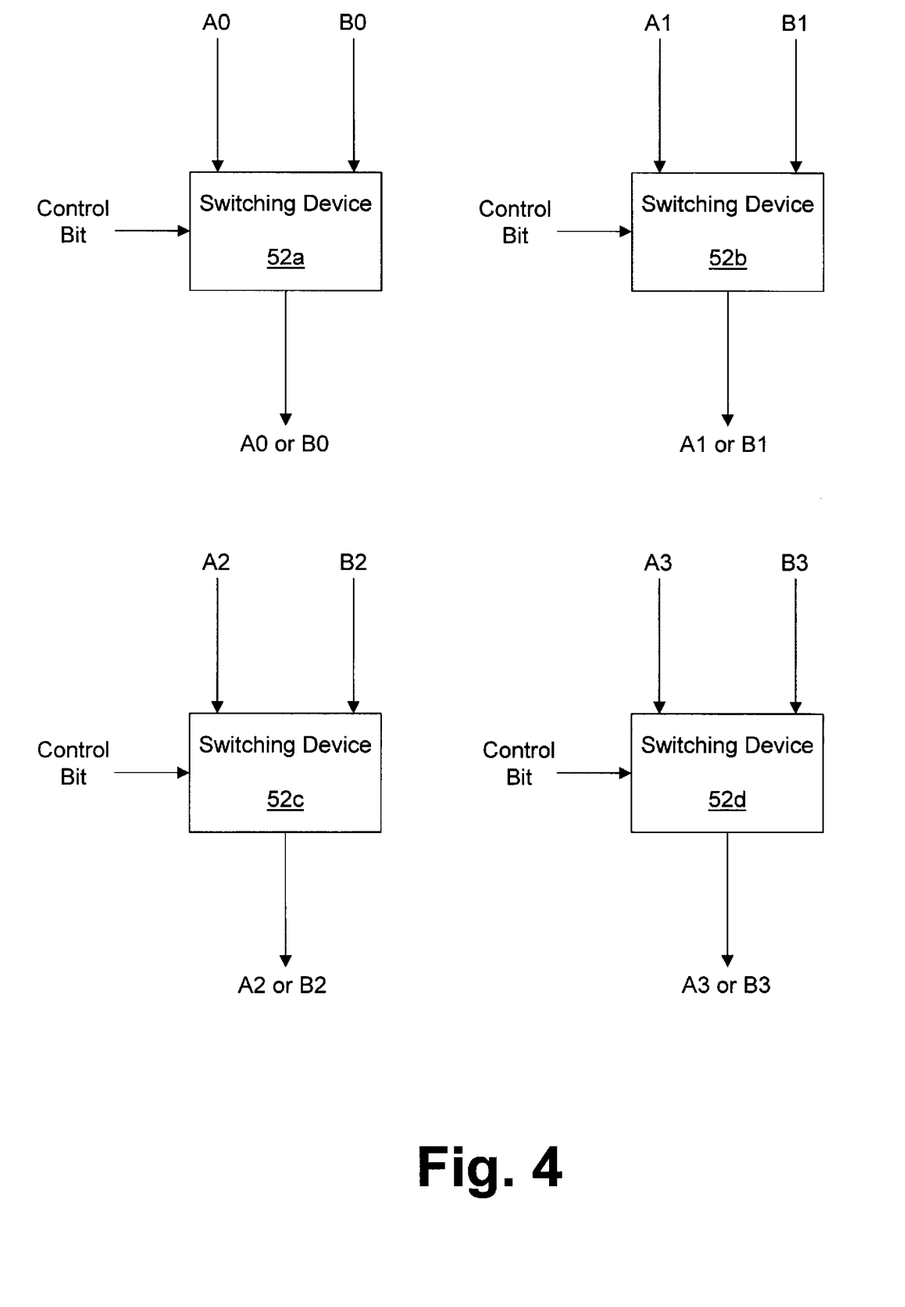
FIG. 4 is a block diagram illustrating the switching devices of FIG. 3.

The digital interpolating system 20 is designed to include four different types of switching devices 52, where the number of different types of switching devices 52 corresponds to the number of bits defining the input values A, B and C. In this regard, each switching device 52 is configured to receive a control bit value and corresponding bit values of inputs A and B as depicted by FIG. 4. Switching device 52a is configured to receive values of the least significant bits of inputs A and B (i.e., bit values A0 and B0 of inputs A and B, respectively) as well as a value of a control bit from input C. Switching device 52a is designed to output B0 when the control bit corresponds to the particular logical value of a binary one and to output A0 when the control bit corresponds to the particular logical value of a binary zero. As an example, switching device 52a may be designed as a multiplexer, a single-throw bipolar switch or any other suitable device known in the art.

Switching devices 52b, 52c and 52d are designed similar to switch 52a. However, switching device 52b is configured to receive bit values A1 and B1, and switching device 52c is designed to receive bit values A2 and B2. Furthermore, switching device 52d is designed to receive bit values A3 and B3. Therefore, switching devices 52b, 52c and 52d are configured to output bit values B1, B2 and B3, respectively, when the control bits received by switching devices 52b, 52c and 52d corresponds to a binary one. Moreover, switching device 52b, 52c and 52d are configured to output bit values A1, A2 and A3, respectively, when the control bits received by switching devices 52b, 52c and 52d correspond to a binary zero.

Figure 5:
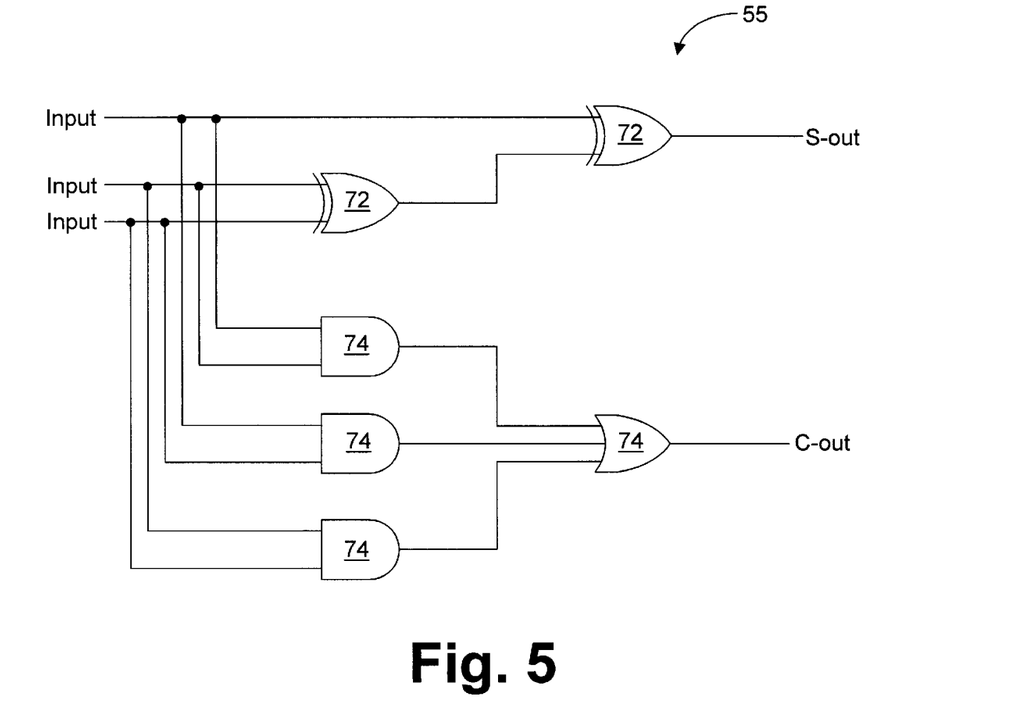
FIG. 5 is a gate diagram illustrating the carry save adders of FIG. 3.

Referring again to FIG. 3, the digital interpolating system 20 includes a plurality of carry save adders 55 configured to receive the outputs of switching devices 52. Each carry save adder 55 is preferably configured as a three input adder. Therefore, as known in the art, carry save adders 55 are designed to output a summation value (S-out) and a carry value (C-out) that represent an addition of each input value received. In this regard, when only one input is high, carry save adders 55 are designed to output a high S-out value and a low C-out value. When only two inputs are high, carry save adders 55 are designed to output a high C-out value and a low S-out value, and when all three inputs are high, carry save adders 55 are designed to output high S-out and C-out values. A suitable implementation of the carry save adders 55 is depicted in FIG. 5. Although other implementations are possible, the carry save adders 55 preferably include two exclusive-OR gates 72, three AND gates 74 and an OR gate 76, as depicted by FIG. 5.

Figure 3A:
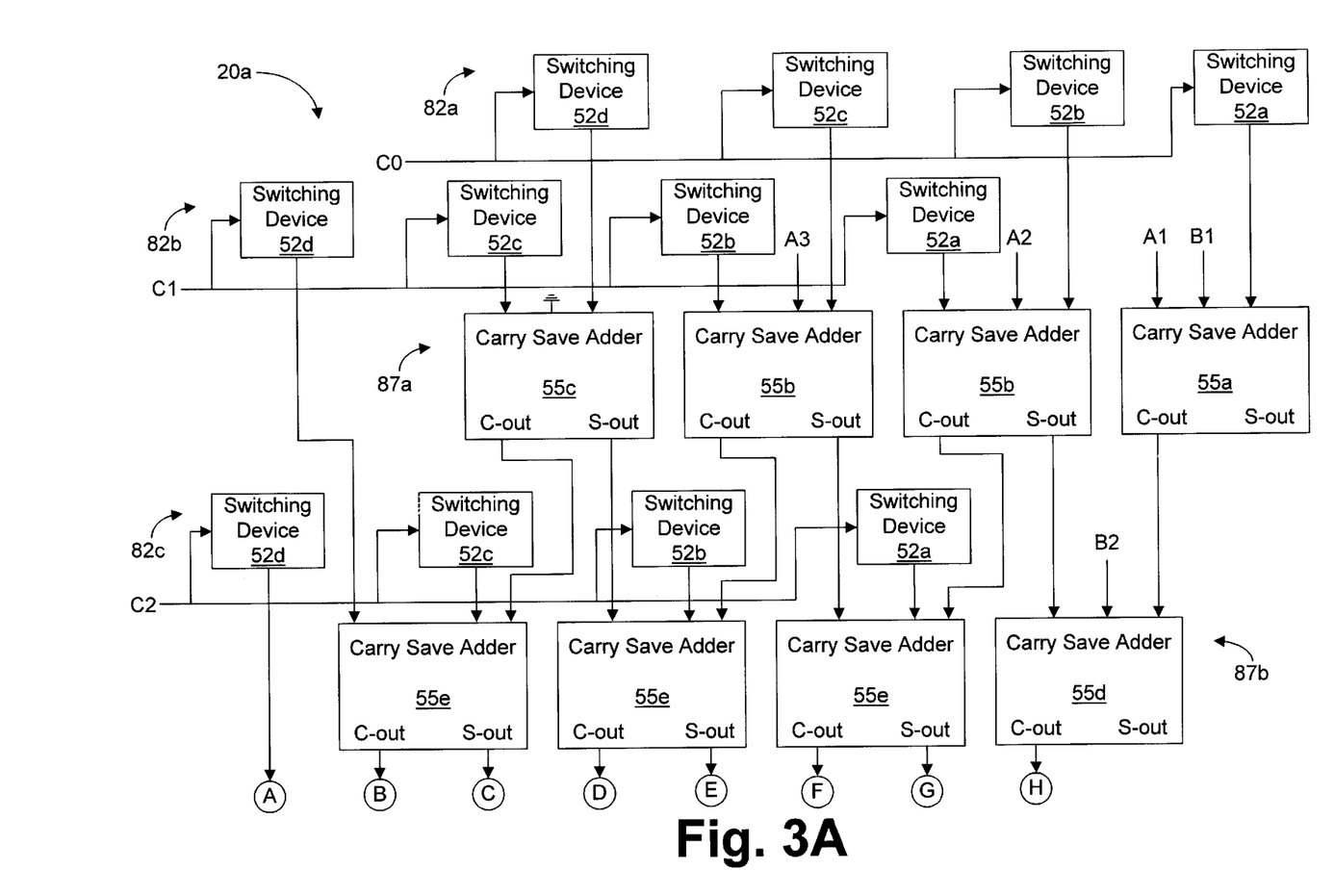
FIG. 3 is a block diagram illustrating a four bit implementation of the digital interpolating system of FIG. 2.
Figure 3B:
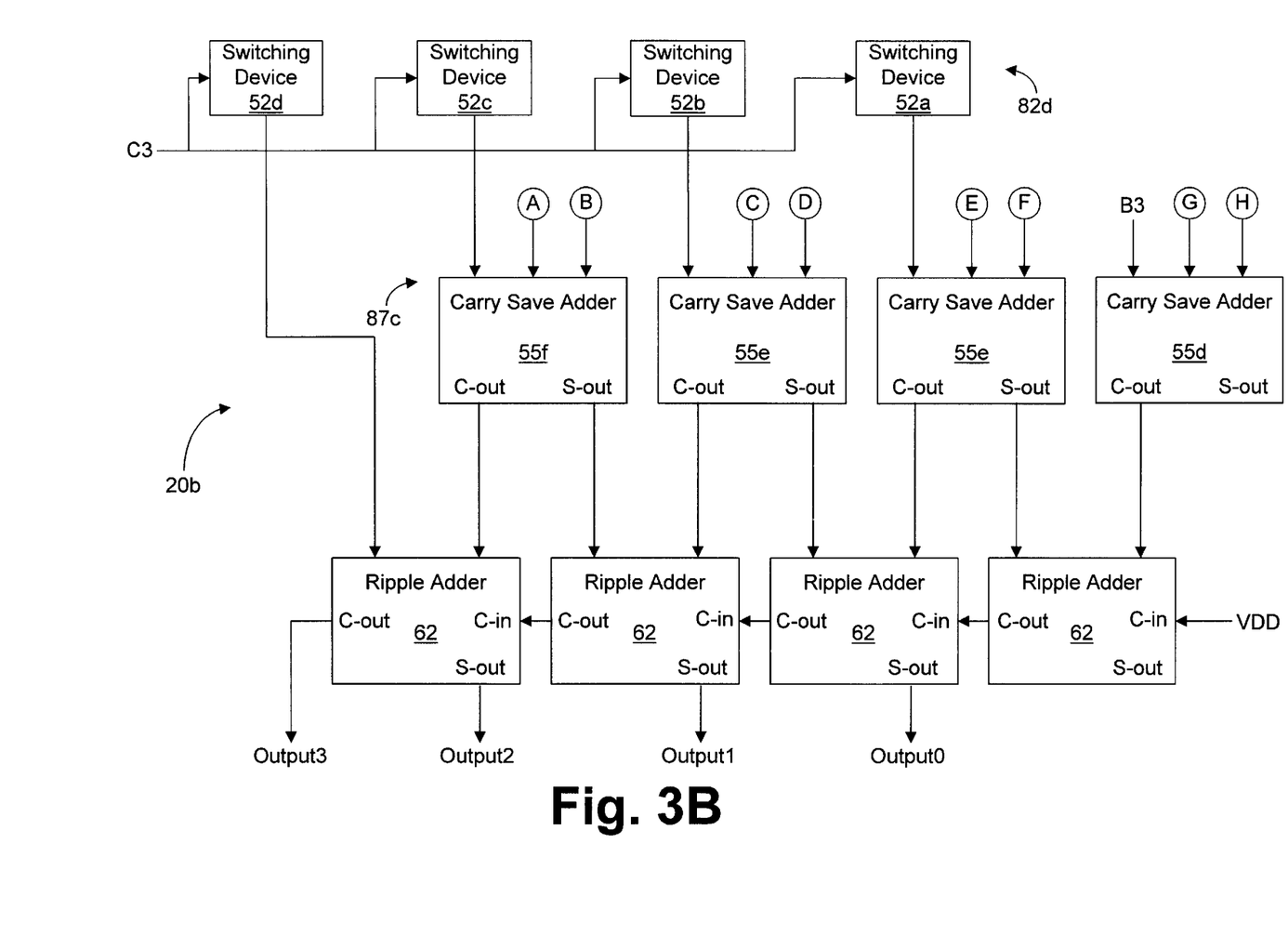

The carry save adders 55 and the switching devices 52 are preferably configured according to FIG. 3. As can be seen with reference to FIGS. 3A and 3B, the digital interpolating system 20 includes pluralities 82a, 82b, 82c and 82d of switching devices 52 coupled to bits C0, C1, C2 and C3, respectively, of the control value received by the system 20. Each plurality 82 is preferably designed to include each type of switching device 52a, 52b, 52c and 52d, and the number of switching devices 52 in each plurality 82 should correspond to the number of bits defining the input signals. For example, where each input signal is four bits, as depicted in FIG. 3, the number of switching devices 52 in each plurality 82 is preferably four.

Furthermore, the digital interpolating system 20 also preferably includes pluralities 87a, 87b and 87c of carry save adders 55. Similar to the plurality 82 of switching devices 52, the number of carry save adders 55 in each plurality 87 preferably corresponds to the number of bits of the input signals. As can be seen by reference to FIG. 3A, each carry save adder 55 of plurality 87a is preferably coupled directly to ground or to a successive bit of input A that has a higher order than the least significant bit A0. In addition, the carry save adder 55a coupled to bit A1 is also preferably coupled directly to bit B1 and switching device 52a of plurality 82a. Furthermore, at least one carry save adder 55 in pluralities 87b and 87c is preferably coupled directly to bits B2 and B3, respectively.

Referring to FIG. 3A, carry save adder 55a is configured to receive a next higher order bit value of A relative to the least significant bit value of A0 for each interpolation performed by system 20. As discussed previously, A in the preferred embodiment contains four bit values (A0, A1, A2 and A3). In this regard, A0 is the least significant bit value of A, A1 is the next higher order bit value relative to A0, A2 is the next higher order bit value relative to A1, and A3 (the most significant bit value) is the next higher order bit value relative to A2. Therefore, carry save adder 55a is preferably configured to receive the value of A1 for each interpolation performed by system 20.

Similarly, carry save adder 55a is also configured to receive a next higher order bit value of B relative to the least significant bit value B0 of B for each interpolation performed by system 20. In the preferred embodiment, the values of B range from B0 to B3 in the same fashion that the values of A range from A0 to A3. Therefore, in addition to receiving A1, carry save adder 55a is also configured to receive the value of B1 for each interpolation performed by system 20.

Additionally, carry save adder 55a is also configured to receive a third value from switching device 52a which is controlled by the least significant bit C0 of control value C. In the preferred embodiment, the values of C range from C0 to C3 in the same fashion that the values of A range from A0 to A3. Therefore, the value of C0 controls the switching device 52a which is transmitting the third value received by carry save adder 55a. Carry save adder 55a is configured to add the values received and to transmit at least the resulting carry value (C-out).

Carry save adders 55b are configured to receive a successive higher order value of A relative to the value (A1) received by carry save adder 55a, as depicted by FIG. 3A. Therefore, in the preferred embodiment, one carry save adder 55b is designed to receive the value of A2, and the other carry save adder 55b is designed to receive the value of A3 for each interpolation performed by system 20. Furthermore, for each interpolation performed by system 20, the carry save adder 55b receiving A2 is also configured to receive a value from switching devices 52b and 52a which are preferably controlled by bit values C0 and C1, respectively. In addition, the carry save adder 55b receiving A3 is also designed to receive a value from switching devices 52c and 52d which are preferably controlled by bit values C0 and C1, respectively. Carry save adders 55b are configured to add the values received and to transmit a sum value (S-out) and a carry value (C-out).

The remaining carry save adder 55c of plurality 87a is configured to receive only two inputs. In this regard, carry save adder 55c is configured to receive values transmitted from switching devices 52d and 52c which are preferably controlled by bit values C0 and C1, respectively. Carry save adder 55c can be a two input adder or a three input adder with one of its inputs connected to a low logical value (i.e., connected to ground). Carry save adder 55c is designed to add the values received and to transmit a sum value and a carry value.

Carry save adders 55d are designed to receive a successive higher order value of B relative to B1. Therefore, in the preferred embodiment, one carry save adder 55d is designed to receive the bit value of B2, and the other carry save adder 55d is designed to receive the bit value of B3 for each interpolation performed by system 20. Furthermore, for each interpolation performed by system 20, each carry save adder 55d is also configured to receive a carry value and a sum value transmitted from another carry save adder 55. Carry save adders 55d are configured to add the values received and to transmit a sum value and a carry value.

Each carry save adder 55e is configured to receive a sum value and a carry value from another carry save adder 55. Furthermore, each carry save adder 55e is also configured to receive a value from a switching device 52 for each interpolation performed by system 20, as depicted by FIGS. 3A and 3B. The carry save adders 55e of plurality 87b are designed to receive values from switching devices 52 that are controlled by bit value C2, and the carry save adders 55e of plurality 87c are designed to receive values from switching devices 52 that are controlled by the most significant bit value C3 of the value C. Similar to the other carry save adders 55, carry save adders 55e are designed to add the values received and to output a sum value and a carry value.

Further depicted by FIGS. 3A and 3B, carry save adder 55f is configured to receive a carry value transmitted from a carry save adder 55e. Carry save adder 55f is further configured to receive a value from switching device 52d of plurality 82c and to receive a value from switching device 52c of plurality 82d. In the preferred embodiment, one of the switching devices 52d (of plurality 82c) transmitting to carry save adder 55f is designed to transmit the most significant bit value (B3) of B when a next lower order bit value C2 relative to the most significant bit value C3 of the control value C corresponds to a logical high value. When the next lower order bit value C2 corresponds to a logical low value, switching device 52d (of plurality 82c) is designed instead to transmit the most significant bit value (A3) of the value A.

Furthermore, the other switching device 52c (of plurality 82d) transmitting to carry save adder 55f is designed to transmit the next lower order bit value B2 of the input value B relative to the most significant bit value B3 when the most significant bit value C3 of the control value C corresponds to a logical high value. When the most significant bit value C3 of the control value C corresponds to a logical zero, switching device 52c (of plurality 82d) is designed instead to transmit the next lower order bit value A2 of the input value A relative to the most significant bit value A3.

Figure 6:
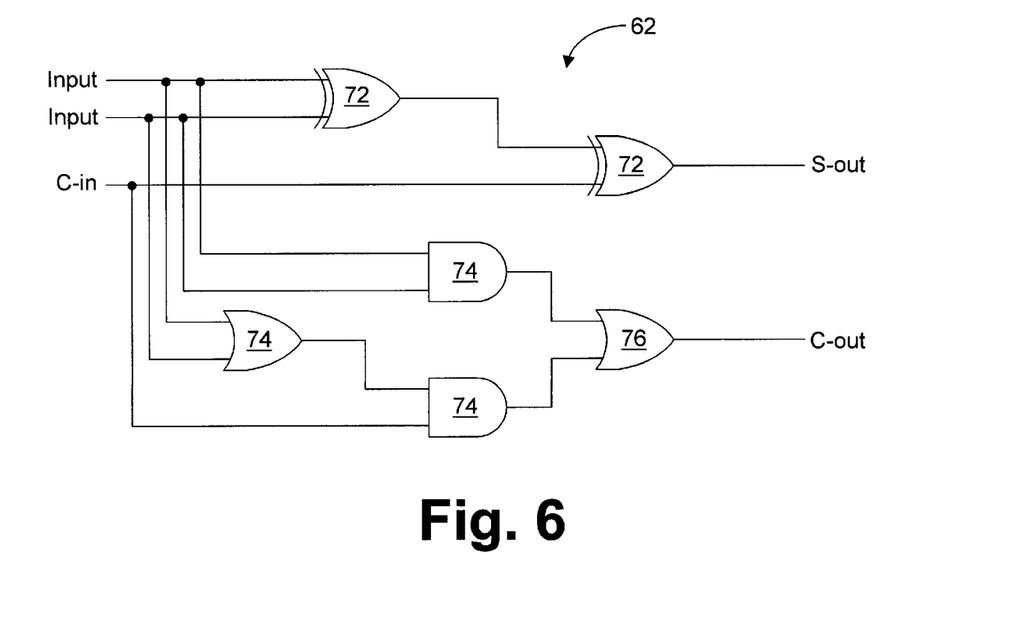
FIG. 6 is a gate diagram illustrating the ripple adders of FIG. 3.

As can be seen by reference to FIG. 3B, ripple adders 62 are designed to add together the outputs of plurality 87c of carry adders 55 and of the switching device 52d of plurality 82d. A suitable implementation of the ripple adders 62 is depicted in FIG. 6. The ripple adders preferably include two OR gates, two exclusive-OR gates and two AND gates as depicted by FIG. 6.

Referring again to FIG. 3B, switching device 52d of plurality 82d is designed to transmit the most significant bit value of either A or B depending on the value of the most significant bit C3 of control value C. In adding the values received, ripple adders 62, as known in the art, are designed to transmit the carry value (C-out) to another ripple adder 62 as a carry input value (C-in) to be used in the addition performed by the other carry adder 62. An end ripple adder 62 is instead designed to output its carry value (C-out) as the most significant bit, output3, of the value output by the system 20 as the interpolated value. By adding together the outputs of plurality 87c of carry adders 55 and of the switching device 52d of plurality 82d in the manner depicted by FIG. 3, the ripple adders 62 are designed to transmit the value (represented by bits output0, output1, output2 and output3) interpolated by the digital interpolating system 20. It should be noted that initially inputting a high binary value (VDD) to the ripple adders 62 as depicted by FIG. 3B achieves the functionality of adding one-half of a least significant bit to the output as shown in Equation 7.

Figure 7A:
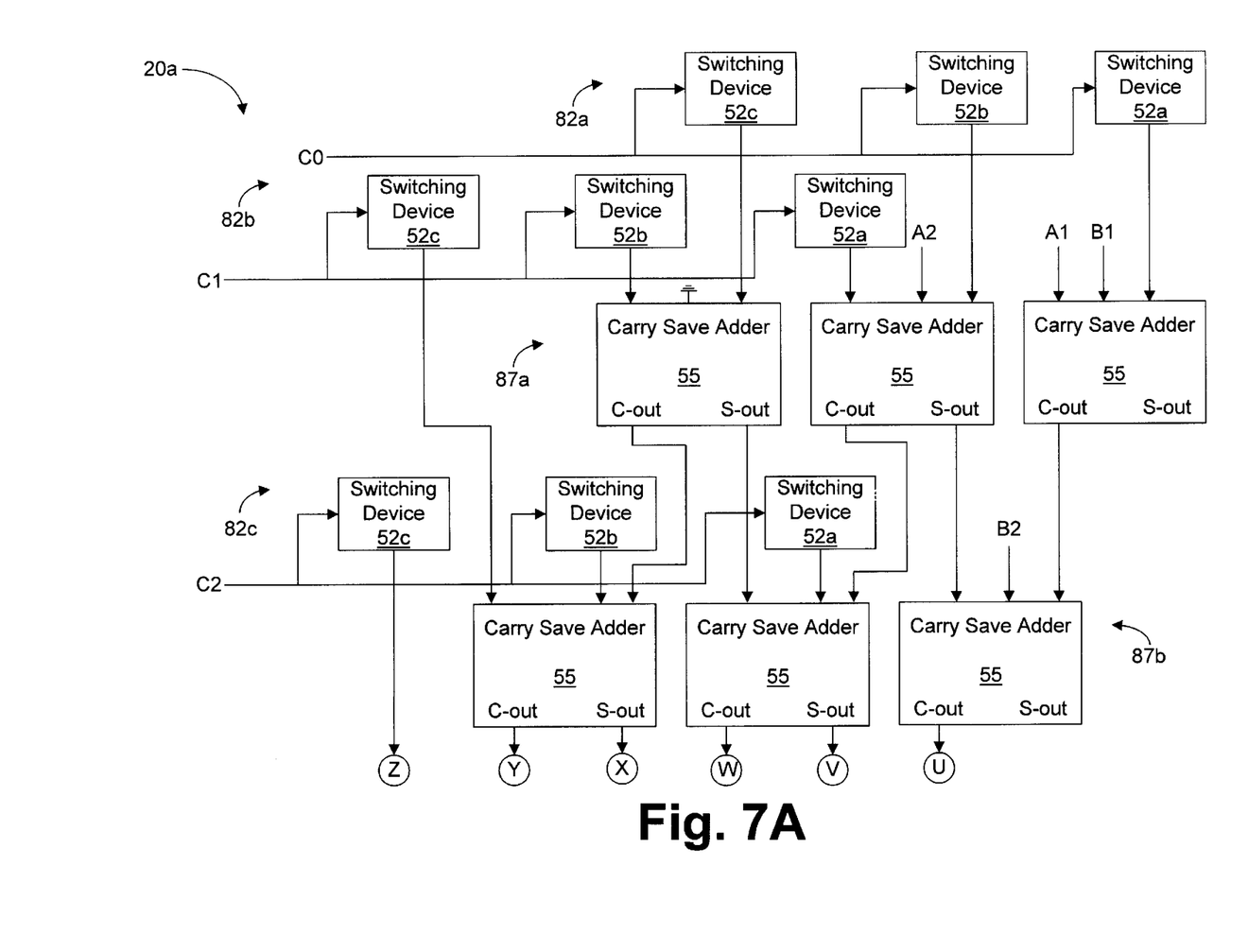
FIG. 7 is a block diagram illustrating a three bit implementation of the digital interpolating system of FIG. 2.
Figure 7B:
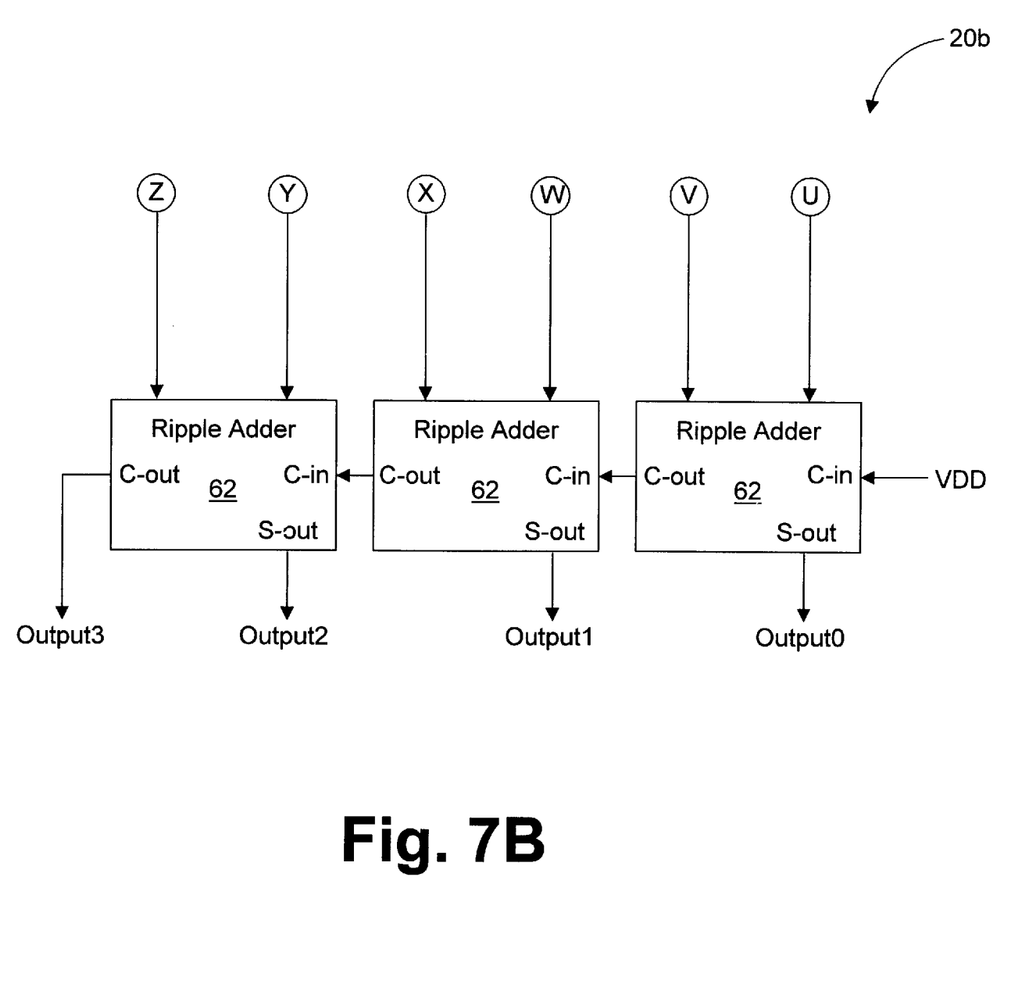
Figure 8:
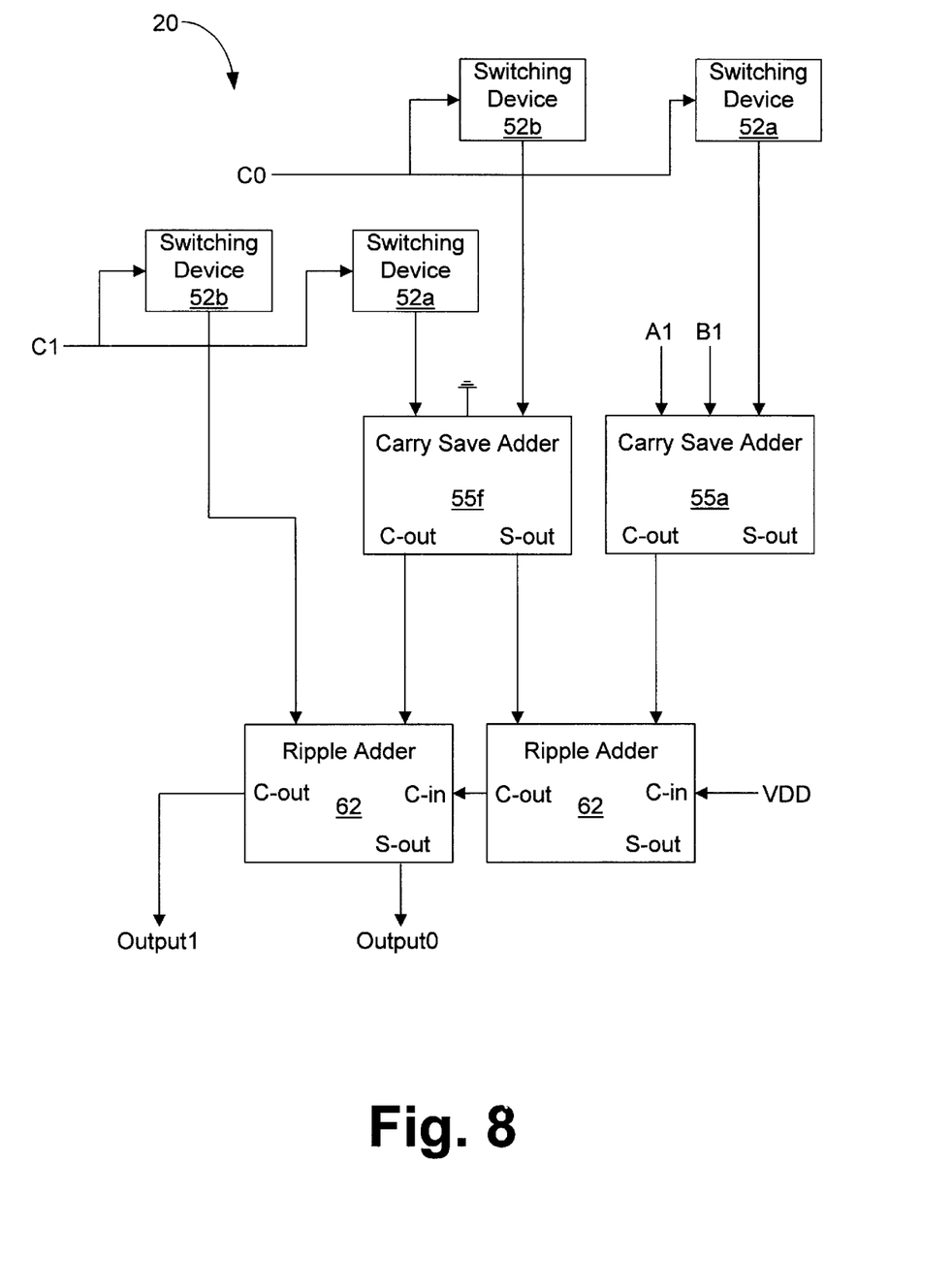
FIG. 8 is a block diagram illustrating a two bit implementation of the digital interpolating system of FIG. 2.

Although FIG. 3 depicts an implementation where the inputs to the digital interpolating system 20 are each four bits, other implementations are possible. For example, FIG. 7 depicts an implementation where the input values are each three bits in length, and FIG. 8 depicts an implementation where the input values are each two bits in length. Since the embodiment depicted in FIG. 8 includes only two carry save adders 55, carry save adder 55f, similar to the carry save adder 55c of the preferred embodiment, is designed to receive only two significant inputs. Furthermore, FIG. 8 represents a minimum number of components for implementing the present invention.

Referring to FIG. 8, a first switching device (i.e., switching device 52a coupled to bit C0) is configured to transmit, as a first output value, a least significant bit value B0 of the maximum digital value B when a least significant bit value C0 of the digital control value C corresponds to a first particular logical value (e.g., a high logical value). The first switching device is further configured to transmit, as the first output value, a least significant bit value A0 of the minimum digital value A when a least significant bit value C0 of the digital control value C corresponds to a second particular logical value (e.g., a low logical value). Therefore, the first switching device of FIG. 8 is designed similar to switching device 52a of plurality 82a of FIG. 3A.

A first adder of FIG. 8 (i.e., carry save adder 55a) is configured to receive the first output value from the first switching device 52a of FIG. 8, a next higher order bit value B1 of the maximum digital value B relative to the least significant bit value B0 of the maximum digital value B, and a next higher order bit value A1 of the digital minimum value relative to the least significant bit value A0 of the digital minimum value A. The first adder 55a of FIG. 8 is further designed to add the three values received and to transmit a first carry value based on the values received by the first adder 55a. Therefore, the first adder 55a is designed similar to the carry save adder 55a of FIG. 3A.

A second switching device of FIG. 8 (i.e., switching device 52b coupled to bit C0) is configured to transmit, as a second output value, a most significant bit value B1 of the maximum digital value B when a next lower order bit value C0 relative to a most significant bit value C1 of the control value C corresponds to the first particular logical value. The second switching device 52b of FIG. 8 is further configured to transmit, as the second output value, a most significant bit value A1 of the minimum digital value A when the next lower order bit value C0 of the digital control value C corresponds to the second particular logical value. Therefore, the second switching device 52b of FIG. 8 is designed similar to switching device 52d of plurality 82c in FIG. 3A.

A third switching device of FIG. 8 (i.e., switching device 52a coupled to bit C1) is configured to transmit as a third output value, a next lower order bit value B0 of the maximum digital value B relative to a most significant bit value B1 of the digital maximum value B when the most significant bit value C1 of the control value C corresponds to the first particular logical value. The third switching device 52a of FIG. 8 is further configured to transmit, as the third output value, a next lower order bit value A0 of the minimum digital value A relative to a most significant bit value A1 of the minimum digital value A when the most significant bit value C1 of the control value C corresponds to the second particular logical value. Therefore the third switching device 52a of FIG. 8 is designed similar to the switching device 52c of plurality 82d in FIG. 3B.

A second adder of FIG. 8 (i.e., carry save adder 55f) is configured to receive the second output value transmitted from the second switching device 52b of FIG. 8 and the third output value transmitted from the third switching device 52a of FIG. 8. The second adder 55f of FIG. 8 is further configured to add the received values and to transmit a second sum value and a second carry value based on the received values. Therefore, the second adder 55f of FIG. 8 is designed similar to the carry save adder 55f of FIG. 3B. A fourth switching device of FIG. 8 (i.e., switching device 52b coupled to bit C1) is configured to transmit, as a fourth output value, the most significant bit value B1 of the maximum digital value B when the most significant bit value C1 of the control value C corresponds to the first particular logical value. The fourth switching device 52b of FIG. 8 is further configured to transmit, as the fourth output value, a most significant bit value A1 of the minimum digital value A when the most significant bit value C1 of the control value C corresponds to the second particular logical value. Therefore, the design of the fourth switching device 52b of FIG. 8 is similar the switching device 52d of plurality 82d in FIG. 3B.

Similar to the ripple adder 62 of FIG. 3B, a plurality of ripple adders 62 of FIG. 8 are designed to receive the sum value of the second adder 55f of FIG. 8 and the carry values of the first adder 55a and the second adder 55f in order to transmit the digital output value that represents the interpolated value of the system 20.

Referring again to FIG. 3 for illustrative purposes, once the interpolating system 20 is configured as discussed hereinbefore, the digital interpolating system 20 receives three input digital values (A, B and C) for each interpolation performed. The value of A represents the minimum output value of the system 20, and the value of B represents the maximum output value of the system 20. The control value C controls which values of A and B are input into the carry save adders 55 and switching devices 52 of FIGS. 3 and 4.

After passing through the digital circuitry shown in FIG. 3, the input signals are output by the ripple adders 62 as bit values output0, output1, output2 and output3. These output bit values define a four bit number which is the interpolated value output by the digital interpolating system 20. Furthermore, this output value corresponds to and can be defined by Equation 7. Therefore, the output of the system 20 corresponds to the value of A, when the control value is a minimum and corresponds to the value of B, when the control value is a maximum. For all other control values between the minimum control value and the maximum control value, the output of the system 20 corresponds to a particular value between the values of A and B.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A digital interpolating system for transmitting a digital output value within a first range defined by a minimum digital value and a maximum digital value, comprising:

digital circuitry configured to receive said maximum digital value, said minimum digital value and a digital control value within a second range defined by a minimum control value and a maximum control value, said digital circuitry further configured to output said digital output value based on said digital control value, wherein said digital output value corresponds to a first sum divided by a second sum, wherein said first sum corresponds to a first value, a second value, a third value, and a fourth value added together and said second sum corresponds to said maximum control value added to a value of one, and wherein said first value corresponds to said maximum digital value multiplied by said digital control value, said second value corresponds to said minimum digital value multiplied by a one's complement of said digital control value, said third value corresponds to a fraction of said minimum digital value, and said fourth value corresponds to a fraction of said maximum digital value.

2. The system of claim 1, wherein said fraction of said minimum digital value corresponds to a value of approximately one-half of said minimum digital value and said fraction of said maximum digital value correspond to a value of approximately one-half of said maximum digital value.

3. The system of claim 1, wherein said first range is linear.

4. The system of claim 1, wherein said digital circuitry further comprises:

a first switching device configured to transmit, as a first output value, a least significant bit value of said maximum digital value when a least significant bit value of said digital control value corresponds to a first particular logical value and configured to transmit, as said first output value, a least significant bit value of said minimum digital value when said least significant bit value of said digital control value corresponds to a second particular logical value;

a first adder configured to receive said first output value, a next higher order bit value of said maximum digital value relative to said least significant bit value of said maximum digital value and a next higher order bit value of said minimum digital value relative to said least significant bit value of said minimum digital value, said first adder further configured to transmit a first carry value based on said values received by said first adder; and means for determining said digital output value based on said first carry value, wherein said first particular logical value is different than said second particular logical value.

5. The system of claim 4, wherein said first and second switching devices are multiplexers.

6. The system of claim 4, wherein said means for determining includes:

a second switching device configured to transmit, as a second output value, a most significant bit value of said maximum digital value when a next lower order bit value of said digital control value relative to a most significant bit value of said control value corresponds to said first particular logical value and configured to transmit as said second output value a most significant bit value of said minimum digital value when said next lower order bit value of said digital control value corresponds to said second particular logical value; and a third switching device configured to transmit, as a third output value, a next lower order bit value of said maximum digital value relative to a most significant bit value of said maximum digital value when said most significant bit value of said control value corresponds to said first particular logical value and configured to transmit as said third output value a next lower order bit value of said minimum digital value relative to a most significant bit value of said minimum digital value when said most significant bit value of said control value corresponds to said second particular logical value; and a second adder configured to receive said second output value and said third output value, said second adder further configured to transmit a second sum value and a second carry value based on said values received by said second adder.

7. The system of claim 6, wherein said means for determining further includes an adding means for receiving said first and second sum values and said first and second carry values and to transmit said digital output value based on said values received from said first and second adders.

8. The system of claim 6, wherein said means for determining further includes:
   a fourth switching device configured to transmit, as a fourth output value, said most significant bit value of said maximum digital value when said most significant bit value of said control value corresponds to said first particular logical value and configured to transmit as said fourth output value a most significant bit value of said minimum digital value when said most significant bit value of said control value corresponds to said second particular logical value; and
   a plurality of adders configured to receive said sum values, said carry values and said fourth output value and to transmit said digital output value based on values received by said plurality of adders.

9. The system of claim 8, wherein said plurality of adders is further configured to continuously receive a logical high value.

10. The system of claim 6, wherein said adding means includes at least one ripple adder configured to receive said second sum value and a carry value received from another ripple adder, said at least one ripple adder configured to transmit a fourth sum value and a fourth carry value based on said second sum value and said carry value received from said another ripple adder.

11. A digital interpolating system for transmitting a digital output value within a range defined by a minimum digital value and a maximum digital value, comprising:
   a first switching device configured to transmit, as a first output value, a least significant bit value of said maximum digital value when a least significant bit value of a digital control value corresponds to a first particular logical value and configured to transmit, as said first output value, a least significant bit value of said minimum digital value when said least significant bit value of said digital control value corresponds to a second particular logical value;
   a first adder configured to receive said first output value, a next higher order bit value of said maximum digital value relative to said least significant bit value of said maximum digital value and a next higher order bit value of said minimum digital value relative to said least significant bit value of said minimum digital value, said first adder further configured to transmit a first carry value based on said values received by said first adder; and
   means for determining said digital output value based on said first carry value,
   wherein said first particular logical value is different than said second particular logical value.

12. The system of claim 11, wherein said first range is linear.

13. The system of claim 12, wherein said means for determining further includes an adding means for receiving said first and second sum values and said first and second carry values and to transmit said digital output value based on said values received from said first and second adders.

14. The system of claim 13, wherein said adding means includes at least one ripple adder configured to receive said second sum value and a carry value received from another ripple adder, said at least one ripple adder configured to transmit a fourth sum value and a fourth carry value based on said second sum value and said carry value received from said another ripple adder.

15. The system of claim 12, wherein said means for determining further includes:
   a fourth switching device configured to transmit, as a fourth output value, said most significant bit value of said maximum digital value when said most significant bit value of said control value corresponds to said first particular logical value and configured to transmit as said fourth output value said most significant bit value of said minimum digital value when said most significant bit value of said control value corresponds to said second particular logical value; and
   a plurality of adders configured to receive said fourth output value and values based on said carry values and said sum values and configured to transmit said digital output value based on said values received by said plurality of adders.

16. The system of claim 15, wherein said plurality of adders is further configured to continuously receive a logical high value.

17. The system of claim 16, further comprising a plurality of ripple adders configured to add values output by a particular plurality of adders within said system.

18. The system of claim 11, wherein said means for determining includes:
   a second switching device configured to transmit, as a second output value, a most significant bit value of said maximum digital value when a next lower order bit value of said digital control value relative to a most significant bit value of said control value corresponds to said first particular logical value and configured to transmit as said second output value a most significant bit value of said minimum digital value when said next lower order bit value of said digital control value corresponds to said second particular logical value; and
   a third switching device configured to transmit, as a third output value, a next lower order bit value of said maximum digital value relative to a most significant bit value of said maximum digital value when said most significant bit value of said control value corresponds to said first particular logical value and configured to transmit as said third output value a next lower order bit value of said minimum digital value relative to a most significant bit value of said minimum digital value when said most significant bit value of said control value corresponds to said second particular logical value; and
   a second adder configured to receive said second output value and said third output value, said second adder further configured to transmit a second sum value and a second carry value based on said values received by said second adder.

19. A digital interpolating system for determining a digital output value within a range defined by a minimum digital value and a maximum digital value, comprising:
   a plurality of switching devices, each of said plurality of switching devices configured to transmit a particular bit value of said minimum digital value upon a detection of a predetermined value of a particular bit of a digital control value and configured to transmit a particular bit value of said maximum digital value upon a detection of another predetermined value of said particular bit of said digital control value;

a first plurality of adders configured to receive each significant bit value of said minimum digital value having a higher order than a least significant bit of said minimum digital value, one of said first plurality of adders configured to receive a bit value of said maximum digital value, a bit value of said minimum digital value and one of said particular bit values transmitted by said plurality of switching devices; and a second plurality of adders configured to receive sum values and carry values transmitted from said first plurality of adders, one of said second plurality of adders configured to receive another bit value of said maximum digital value, one of said sum values and one of said carry values.

20. A linear digital interpolating system, comprising:

means for receiving a minimum digital input value (A), a maximum digital input value (B), and a control value (C); and means for interpolating a digital output value (O) defined by the following equation:

$$O=\text{integer}((BC+A(MaxC-C)+\text{integer}(x)+\text{integer}(y))/(MaxC+1)+z)$$

where MaxC corresponds to a maximum value of C, x corresponds to a fraction of A, y corresponds to a fraction of B, and z corresponds to a numerical value.

21. The system of claim 20, wherein z corresponds to approximately one-half of a least significant bit.

22. The system of claim 21, wherein x is approximately one-half of A and y is approximately one-half of B.

23. A digital interpolating method for determining a digital output value within a first range defined by a minimum value and a maximum value based on a digital control value within a second range defined by a minimum control value and a maximum control value, comprising the steps of:

multiplying said maximum value by said digital control value to form a first value;

multiplying said minimum value by a one's complement of said digital control value to form a second value;

forming a first fraction value corresponding to a fraction of said minimum value;

forming a second fraction value corresponding to a fraction of said maximum value;

summing said first value, said second value, said first fraction value and said second fraction value to form a summation value;

dividing said summation value by a sum corresponding to said maximum control value added to a value of one to form said digital output value; and coloring a pixel of a computer system based on said digital output value.

24. The method of claim 23, further comprising the step of adding one-half of a least significant bit to a result of said dividing step in forming said digital output value.

25. The method of claim 23, wherein said first fraction value corresponds to a value of approximately one-half of said minimum value and said second fraction value corresponds to a value of approximately one-half of said maximum value.

26. The method of claim 23, wherein said first range is linear.

27. The method of claim 23, further comprising the steps of:

transmitting a first input value, said first input value being a least significant bit value of said maximum value when a least significant bit of said digital control value corresponds to a first particular logical value and said first input value being a least significant bit value of said minimum value when said least significant bit of said digital control value corresponds to a second particular logical value;

receiving said first input value;

adding said first input value to a next higher order bit value of said maximum value relative to said least significant bit value of said maximum value and to a next higher order bit value of said minimum value relative to said least significant bit value of said minimum value;

transmitting a first carry value and a first sum value based on said adding step; and generating said digital output value based on said first carry value and said first sum value, wherein said first particular value is different than said second particular value.

28. The method of claim 27, wherein said generating step includes the steps of:

transmitting a second input value, said second input value being a most significant bit value of said maximum value when a next lower order bit value of said digital control value relative to a most significant bit value of said digital control value corresponds to said first particular logical value and said second input value being a most significant bit value of said minimum value when said next lower order bit of said digital control value corresponds to a second particular logical value;

transmitting a third input value, said third input value being a next lower order bit value of said maximum value relative to a most significant bit value of said maximum value when said most significant bit value of said digital control value corresponds to said first particular logical value and said third input value being a next lower order bit value of said minimum value relative to a most significant bit value of said minimum value when said most significant bit value of said digital control value corresponds to said second particular logical value;

receiving said second input value and said third input value;

summing said second input value and said third input value; and forming a second carry value and a second sum value based on said summing step.

29. The method of claim 28, wherein said generating step further includes the steps of:

transmitting a fourth input value, said fourth input value being said most significant bit value of said maximum value when said most significant bit value of said digital control value corresponds to said first particular logical value and said fourth input value being said most significant bit value of said minimum value when said most significant bit value of said digital control value corresponds to said particular logical value; and summing said fourth output value with values based on said sum and carry values to form said digital output value.

30. A digital interpolating method for determining a digital output value within a range defined by a minimum value and a maximum value, comprising the steps of:

transmitting a first input value, said first input value being a least significant bit value of said maximum value when a least significant bit of a digital control value corresponds to a first particular logical value and said first input value being a least significant bit value of said minimum value when said least significant bit of said digital control value corresponds to a second particular logical value;

receiving said first input value;

adding said first input value to a next higher order bit value of said maximum value relative to said least significant bit value of said maximum value and to a next higher order bit value of said minimum value relative to said least significant bit value of said minimum value;

transmitting a first carry value and a first sum value based on said adding step;

generating said digital output value based on said first carry value and said first sum value; and coloring a pixel of a computer system based on said digital output value, wherein said first particular value is different than said second particular value.

31. The method of claim 30, wherein said generating step includes the steps of:

transmitting a second input value, said second input value being a most significant bit value of said maximum value when a next lower order bit value of said digital control value relative to a most significant bit value of said digital control value corresponds to said first particular logical value and said second input value being a most significant bit value of said minimum value when said next lower order bit of said digital control value corresponds to a second particular logical value;

transmitting a third input value, said third input value being a next lower order bit value of said maximum value relative to a most significant bit value of said maximum value when said most significant bit value of said digital control value corresponds to said first particular logical value and said third input value being a next lower order bit value of said minimum value relative to a most significant bit value of said minimum value when said most significant bit value of said digital control value corresponds to said second particular logical value;

receiving said second input value and said third input value;

summing said second input value and said third input value; and forming a second carry value and a second sum value based on said summing step.

32. The method of claim 31, wherein said generating step further includes the steps of:

transmitting a fourth input value, said fourth input value being said most significant bit value of said maximum value when said most significant bit value of said digital control value corresponds to said first particular logical value and said fourth input value being said most significant bit value of said minimum value when said most significant bit value of said digital control value corresponds to said particular logical value; and summing said fourth output value with values based on said sum and carry values to form said digital output value.

33. A linear digital interpolating method, comprising the steps of:

receiving a minimum digital input value (A), a maximum digital input value (B), and a control value (C);

interpolating a digital output value (O) based on the following equation:

$$O=(BC+A(MaxC-C)+integer(x)+integer(y))/(MaxC+1)$$

where MaxC corresponds to a maximum value of C, x corresponds to a fraction of A, and y corresponds to a fraction of B; and coloring a pixel of a computer system based on said digital output value.

34. The method of claim 33, wherein x is approximately one-half of A and y is approximately one-half of B.

35. A linear digital interpolating system, comprising:

circuitry configured to receive a minimum digital input value (A), a maximum digital input value (B), and a control value (C);

circuitry configured to interpolate a digital output value (O) defined by the following equation:

$$O=integer((BC+A(MaxC-C)+integer(x)+integer(y))/(MaxC+1)+z)$$

where MaxC corresponds to a maximum value of C, x corresponds to a fraction of A, y corresponds to a fraction of B, and z corresponds to a numerical value.

36. The system of claim 35, wherein x is approximately one-half of A and y is approximately one-half of B.

37. The system of claim 36, wherein z is approximately one-half of a least significant bit.

* * * * *